E. J. BRYANT.
PLUG GAGE.
APPLICATION FILED FEB. 3, 1917.
Reissued Oct. 28, 1919. 14,743.
Fig. 2.
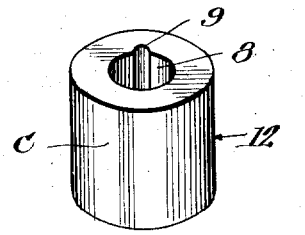
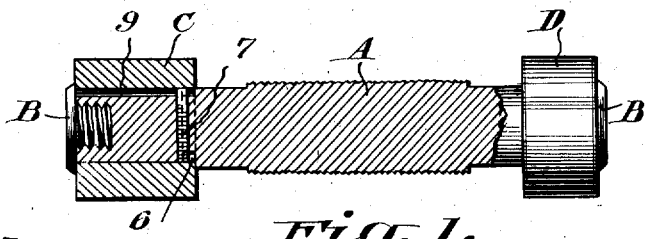
Fig. 1.
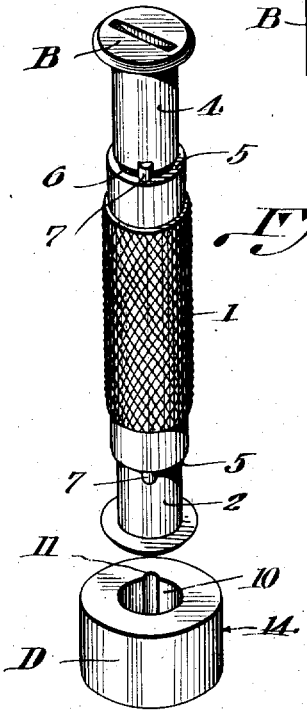
Fig. 3.
Fig. 4.
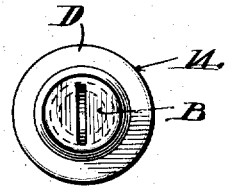
Fig. 5.
Inventor:
Elmer J. Bryant
by Ramsey and Larrabee,
Attys.
THE COLUMBIA PLANOGRAPH CO., WASHINGTON, D. C.

UNITED STATES PATENT OFFICE.

ELMER J. BRYANT, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

PLUG-GAGE.

14,743. Specification of Reissued Letters Patent. Reissued Oct. 28, 1919.

Original No. 1,186,075, dated June 6, 1916, Serial No. 3,049, filed January 19, 1915. Application for reissue filed February 3, 1917. Serial No. 146,541.

*To all whom it may concern:*

Be it known that I, ELMER J. BRYANT, a citizen of the United States, residing in Woonsocket, in the county of Providence, State of Rhode Island, have invented certain new and useful Improvements in Plug-Gages, of which the following is a specification, reference being had to the accompanying drawings.

This invention relates broadly to tools, and more particularly to a plug gage for determinating accurately predetermined dimensions of circular openings.

The principal object of this invention is to produce an accurate plug gage having interchangeable wear surfaces.

A further object of this invention is to provide a plug gage of such construction as permits one handle to be interchangeable with the plurality of sets of gage heads.

Another object of this invention is to produce a plug gage of the double-end type having solid removable gage heads constructed to be fixedly and rigidly secured to the handle.

Still other and further objects of this invention will in part be obvious and will in part be pointed out by reference to the accompanying drawings, in which like characters are used to represent like parts throughout the several figures thereof.

Figure 1 is an elevational view showing a portion of the gage in section. Fig. 2 is a view illustrating one gage head detached from the handle. Fig. 3 is a perspective view showing the handle with the retaining screws in place. Fig. 4 is a view illustrating the other gage head detached from the handle. Fig. 5 is an end view.

The most common form of double-end plug gages, is a gage wherein the gage heads and the handle are formed from a single piece of metal. In gages of this type each different pair of gage heads necessarily includes a handle, and consequently, the handle is multiplied as many times as there are gage heads, so that a set of gages of various sizes includes a considerable amount of unnecessary material and weight. Also a set of gages of this type occupies considerable amount of space. Furthermore, the period of usefulness of a gage head in a fixed gage is determined by the wear on the outer ends of the gage heads.

The invention, which will hereinafter be described in detail, comprises a plug gage wherein a single handle may be utilized to carry a number of removable heads of predetermined sizes. These heads are constructed in pairs and are ground to true cylindrical surfaces, so that the heads may be reversed upon the handle and thus provide a gage with substantially double the wear of a gage with a fixed head.

Referring now more particularly to the drawings, a body portion A is provided with a knurled handle 1, which terminates in a short cylindrical support 2 and a relatively longer cylindrical support 4. Accurately formed surfaces 5 lie in planes perpendicular to the axis of the cylindrical supports 2 and 4 and are carried below the said cylindrical surfaces to form one wall of the grooves 6. The outer ends of the body portion A are tapped to receive the cone-headed stub screws B, and are drilled adjacent the grooves 6 to receive the retaining pins 7. In gages of this character for measuring exact dimensions it is necessary to provide for a major dimension limit. This is determined by forming one end of the gage to the exact predetermined dimension, and designating this end as the "Go" end, which will pass work that fits the head. While a very slightly larger diameter gage head is provided on the other end, and is designated as the "Not go" end. This end is used to reject such work as will receive this gage head. It is particularly desirable that the gage itself will unmistakably indicate which is the "Go" and which is the "Not go" end of the gage. In the present case the "Go" end of the gage is indicated by the longer gage head shown in Fig. 2, and comprises the solid metal hollow cylinder C which is provided with an opening 8 adapted to fit upon the long cylindrical support 4, and a keyway 9 constructed to fit over the projecting end of the retaining pin 7 on the longer cylinder support 4. The "Not go" end of the gage comprises the short solid hollow cylinder D which is likewise provided with an opening 10 adapted to fit upon the short cylindrical support 2, and a key-way 11 adapted to fit over the projecting head of the retaining pin 7 carried adjacent the support 2. The relative lengths of the gage heads unmistakably distinguish the "Go" from the "Not go" end.

Since the work faces are accurately ground to true cylindrical surfaces 12 and 14, respectively, and since the cylindrical supports 2 and 4 are true cylindrical surfaces that accurately fit the respective openings 8 and 10, it is obvious that either end of the respective gage heads may be secured adjacent the outer ends of the body portion. Particularly is this true since each end of each gage head is fitted or ground to lie in a plane at right angles to the axis of the cylinder determining the work faces of the respective gage head. It will be noted that the small grooves 6 lying adjacent the surfaces 5, permit the supporting surfaces 2 and 4 to be accurately ground their full length and also provides grooves for the reception of foreign matter of any character, thereby enabling the gage heads to be drawn or forced very tightly against the surfaces 5, so that when the heads are in position upon the body portion A the entire gage is substantially as rigid as if it were an integral piece of metal. This enables the user thereof to "feel" the set of a gage head in a piece of work with the same degree of positive determination as if the gage were formed with a single piece of metal. Furthermore, it will be noted that the mass of metal carried by the gage heads is absolutely symmetric in every direction, with the slight exception of the key-way, which is so slight as to be negligible. This uniformity of metal prevents any distortion of the gage surfaces due to molecular changing, either in aging of the metal after it has been hardened, or distortion due to temperature changes. Gages of this character are used for extremely accurate work and security against molecular changes is of great importance.

Having thus described my invention, what I claim is:—

1. In a plug gage in combination, a body portion comprising a handle, supports formed on each end of said handle, stops on said handle in planes at right angles to the axes of said supports, the body portion being provided with grooves adjacent said stops, solid cylindrical gage heads provided with openings to accurately fit said supports, the ends of said gage heads being in planes at right angles to the axes of the work faces of said heads, said heads being constructed to differentiate one from the other; and removable means to secure said heads in position on said handle.

2. In a plug gage in combination, a body portion comprising a handle, cylindrical supports formed on each end of said handle, said body portion being provided with shoulders comprising stop faces arranged at right angles to the axes of said supports, said body portion being provided with circumferential grooves adjacent said stop surfaces and extending below the cylindrical surfaces of said supports, solid cylindrical gage heads provided with openings adapted to fit said supports, one of said gage heads being relatively long and formed with a cylindrical work surface having a diameter of a predetermined dimension, the other of said gage heads being relatively short and having a cylindrical work surface of slightly larger diameter than said predetermined dimension, and clamping means to secure said gage heads in position on said handle and against said stop surfaces.

3. In a plug gage, in combination, a body portion comprising a handle, supports formed on each end of said handle, stops on said handle adjacent said supports, projections extending outwardly from said supports, cylindrical gage heads provided with openings to accurately fit said supports, said gage heads also provided with recesses to engage and interlock with said projections, both ends of said gage heads being constructed to coöperate with said stops in such manner that said heads are reversible to obviate wear, flat head screws extending into said supporting members and over the ends of said gage heads to retain said gage heads in position upon said supports.

4. A plug gage comprising, in combination, a body portion forming a handle, a cylindrical support formed on the end of said body portion, said body portion being provided with a shoulder constructed to comprise a stop face and arranged at right angles to the axis of said support, said body portion also being provided with a circumferential groove adjacent said stop face and extending below a surface of said support, a cylindrical gage head provided with an opening adapted to fit said support, said gage head being a substantially true cylinder of a predetermined diameter and having ends constructed to abut against said stop surface whereby either of the end surfaces of said cylinder may coöperate with said stop surface to enable the gage head to be reversed to obviate wear, and means to securely maintain said gage head against said stop surface and firmly mounted upon the said handle.

5. A plug gage comprising, in combination, a body portion adapted to form a handle, a support on the end of said body portion, and a stop adjacent said support, a cylindrical gage head provided with an opening to accurately fit said support, means to prevent the rotation of said gage head relative to said support when said gage head is in position upon said support, both ends of said gage head being constructed to coöperate with said stop in such manner that said head may be reversible to obviate wear, and means adapted to maintain said head tightly against said stop when said head is operatively mounted upon said support.

6. A plug gage comprising, in combination, a supporting handle, a support formed on the end of said handle, a cylindrical gage head comprising a member having a substantially true cylindrical work surface, said member being constructed with an opening of uniform cross-section extending from end to end of said member whereby said member is adapted to fit upon and be reversible with reference to said support, and retaining means operative adjacent the end of the gage head for rigidly clamping said gage head to said supporting handle.

7. A plug gage comprising in combination, a supporting handle, a support formed on the end of said handle, a cylindrical gage head having a substantially true cylindrical work surface, said handle being provided with a shoulder the plane of which is at right angles to the axis of the cylindrical surface of the gage head, said head being constructed to fit upon and be reversible with reference to said support, and being provided with plane surfaces at right angles to the axis of the gage head, and retaining means for rigidly securing said gage head upon said handle and for tightly compressing one of said plane surfaces on the head against the shoulder on the handle, whereby the retaining forces act substantially parallel to the axis of said head.

ELMER J. BRYANT.

Copies of this patent may be obtained for five cents each, by addressing the "Commissioner of Patents, Washington, D. C."